May 9, 1950  A. C. FAEHNEL  2,506,862
STEAK TENDERIZER
Filed Oct. 15, 1946
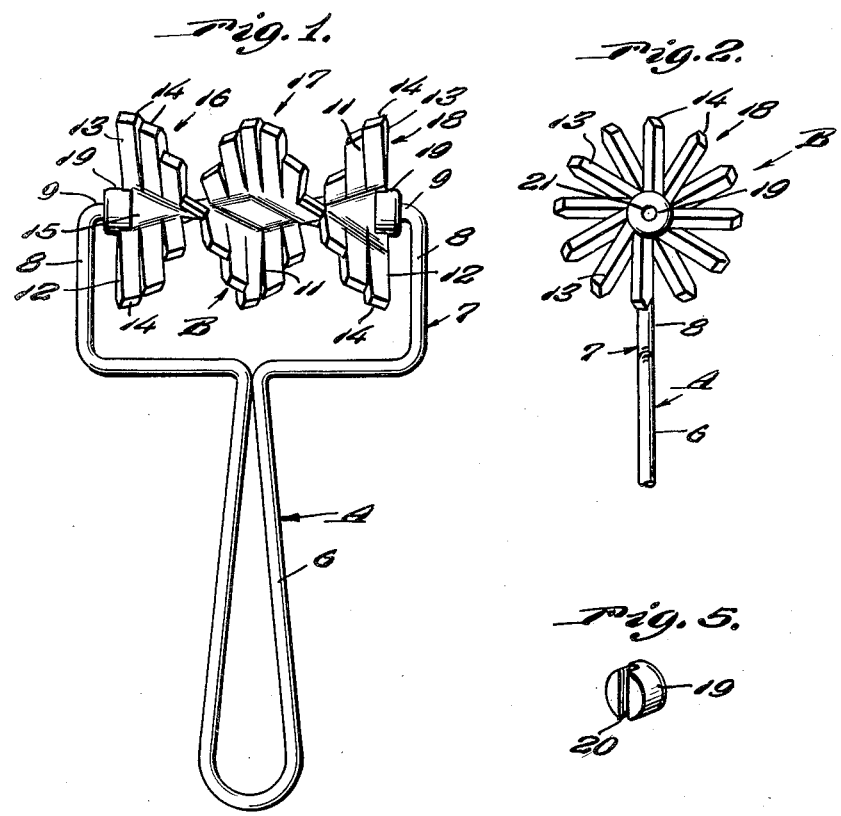
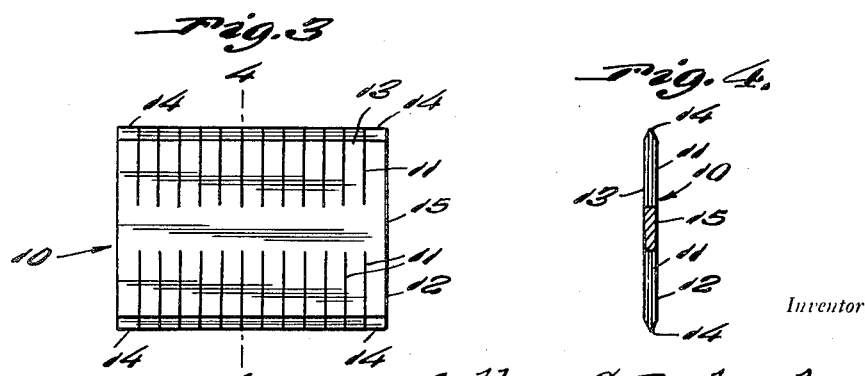
Inventor
Arthur C. Faehnel
By Clarence A. O'Brien
and Harvey B. Jacobson
Attorneys Patented May 9, 1950

2,506,862

UNITED STATES PATENT OFFICE 2,506,862

STEAK TENDERIZER

Arthur C. Faehnel, Milwaukee, Wis.

Application October 15, 1946, Serial No. 703,383

3 Claims. (Cl. 17—29)

The present invention relates to meat tendering appliances and implements, many types of which have become known as steak tenderizers, the implement constituting the form of the invention under advisement being equipped with a toothed, free rolling rotor which, in operation, serves to prick and scarify the fibrous sinews and gristly portions, breaking same down from tough to tender, whereby to render the tenderized and cooked product susceptible of easy mastication.

As revealed by way of the preceding opening statement of the invention, I am aware that scarifying type tenderers are not new. It follows, therefore, that the general purpose of the invention is to provide a so-called steak tenderizer which is characterized by and possessed of features of novelty and adequate functioning not found in meat tenderers offered to the trade by competitive sources.

Keeping in mind disadvantages such as attend comparatively complex and structurally complicated adaptations covered in prior art devices presently known to me, a principal object in mind is the adoption and consequent provision of a structure which is virtually devoid of intricate parts and, as a result thereof, is characterized by the utmost in prerequisites of simplicity, economy, and ease of handling when in use.

Further, the smoothness of free rolling and substantially self-propelling contact of the toothed roller or rotor and the back and forth tractive facilities is another favorable aspect of the invention tending toward assurance of quick and easy manipulation and otherwise expedient handling of the implement.

More specifically, the invention has to do with the construction of the toothed rotor, this being of a form in which the teeth coact with the hub in defining a substantially helical-type rotor, the latter being fashioned from a single flat plate whose longitudinal edges are slitted to define tongues which are bendable, by bodily twisting opposite ends of the hub or central portion of the plate in opposite directions, thus spreading and forming the aforementioned teeth.

Other objects, features and advantages of the invention will become more readily apparent from the following description and the accompanying illustrative drawings.

In the drawings, wherein like numerals are employed to designate like parts throughout the views:

Figure 1 is an elevational view of a toothed rotor scarifier-type steak tenderizer.

Figure 2 is an end view of the same, observing the embodiment of Figure 1 in a direction from right to left, a portion of the frame being broken away.

Figure 3 is a plan view of the slitted plate from which the toothed helical-form rotor is fashioned.

Figure 4 is a cross section on the plane of the line 4—4 of Figure 3.

Figure 5 is a perspective view of what may be identified as a hub-cap.

The invention is made up of two principal parts; namely, the wire frame unit A and the toothed rotor unit B. The part A is formed from a single length of wire bent between its ends and upon itself to provide a suitable handle 6 and a springy bail 7 whose ends 8 have lateral inturned terminals 9 functioning as journals.

Observing the finished toothed rotor, this resembles, looking at same in end view, a "helical screw." Because of the helical disposition of the teeth, the rotor provides peripheral contact of the teeth with the meat in such a way that it figuratively "crawls" back and forth. This provides for the aforementioned free rolling and self propelling contact and assures the desired inherent function of easy handling and effective treatment of the meat surfaces for tendering purposes. Perhaps, however, it is best to describe the rotor in the making, and to this end attention is directed to Figure 3, where it will be seen that said rotor is fashioned from a substantially flat rectangular plate 10 having opposite longitudinal edges formed with slits 11 and said slits defining bendable tongues 12 and 13 which, in turn, "fan out" and define the helical teeth. The outer ends of the tongues or potential teeth are double beveled to provide cutting edges, as at points 14. It follows, therefore, that by placing opposite end portions of the central or hub region 15 of the plate in a properly constructed clamping and twisting machine, said ends twisted forcibly in opposite directions, whereby to "fan" the tongues to provide the stated helical teeth. This twisting step actually defines three sectors 16, 17 and 18, the end sectors 16 and 18 being substantially the same and approximately one-half the width (in side elevation in Figure 1) of the intermediate or central sector 17. The main point, however, is the twisting in opposite directions of the hub portion of the plate and defining the helical (sometimes referred to as spiral) teeth. Disk-like members 19, of the type shown in Fig. 5, are provided and these have kerfs 20 formed in inner faces and central sockets 21 (Fig. 2) formed in outer faces. Thus, said parts 19 function as hub-caps and fit over the ends or hub portions of the rotor, and the journal terminals 9 resiliently snap into the sockets to provide the desired idling result.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

I claim:

1. A meat tenderer of the class described comprising a handle having a resilient rotor accommodating and supporting U-shaped bail, the free ends of the arms of said bail carrying aligned journals, hub caps rotatably mounted on said journals, and a freely rotatable scarifying and tendering rotor situated between said caps, said rotor having a plate portion and said hub caps having assembling and retaining kerfs functioning as keyways, coacting edge portions of said plate portion being keyed in said keyways.

2. A meat tenderer of the class described comprising a handle having a resilient rotor accommodating and supporting U-shaped bail, the free ends of the arms of said bail carrying aligned journals, a rotor having tendering teeth and including a plate portion with straight ends, hub caps having kerfs providing keyways, the central portions of said ends being keyed in secured in said keyways, said hub caps also having bearing sockets, and said journals being removably fitted into said sockets.

3. As a new article of manufacture and a component part of a steak tenderizer of the type shown and described, a rotor embodying a plate longitudinally and axially twisted and provided along opposite longitudinal edges with individual sturdy scarifying teeth, said teeth having their outer free ends provided with cutting edges, and hub caps secured to the central transverse end portions of said rotor and provided with bearing sockets to accommodate inturned supporting journals.

ARTHUR C. FAEHNEL.

REFERENCES CITED

The following references are of record in the file of this patent:

UNITED STATES PATENTS

| Number | Name | Date |
|---|---|---|
| 776,945 | Riedel | Dec. 6, 1904 |
| 793,714 | Deal | July 4, 1905 |
| 866,106 | Baker | Sept. 17, 1907 |
| 1,490,421 | Falley | Apr. 15, 1924 |
| 2,378,646 | Manning | June 19, 1945 |